RE 24960

United States Patent Office 2,911,336
Patented Nov. 3, 1959

2,911,336

FUNGICIDES

Ewald Urbschat, Koln-Mulheim, and Paul-Ernst Frohberger, Odenthal, Reg. Bezirk Koln, Germany, assignors to Farbenfabriken Bayer Aktiengesellschaft, Leverkusen, Germany, a corporation of Germany No Drawing. Application September 20, 1955
Serial No. 535,513

Claims priority, application Germany September 24, 1954

8 Claims. (Cl. 167—30)

The present invention relates to useful improvements in fungicides; more particularly it is concerned with compounds of the type embraced by the general formula

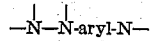

which are useful in rendering seed grain immune against attacks by fungi.

Good results have been obtained in controlling, by seed dressing, a number of plant diseases caused by micro-organisms, which adhere to the seeds and are spread with the seeds. The phyto-pathogenic fungi which can be controlled by seed dressing include *Tilletia tritici, Ustilago avenae, Helminthosporium gramineum, Fusarium nievale, Ustilago hordei,* and *Phoma betae.*

Among the customary seed dressing agents, the preparations having a basis of organic mercury compounds, which are highly effective in formulations containing only a few percent of the active substances, play the most important part. Such preparations show an outstanding efficacy and kill the organisms on the seeds practically completely. As compared with these highly effective mercury dressing agents, other preparations containing metal-free active substances are of secondary importance since they have to be applied at a higher concentration, which renders them uneconomic to agriculture, or they fail to show a universal activity.

Apart from certain toxicological deficiencies, the previously known highly effective mercury disinfectants suffer from a considerable disadvantage which is due to the fact that only the surface of the seeds and the soil surrounding same within a radius of 1–2 mm. can be disinfected therewith and the seedling growing out of this narrowly restricted spermatosphere is subject to attack by phyto-pathogenic soil-borne fungi.

A great variety of soil-borne fungi, such as *Pythium debaryanum, Aphanomyces laevis, Phymatotrichum omnivorum,* and *Rhizoctonia solani,* cause germination diseases on various plants, such as leguminous plants, beet, maize, flax and cotton (for instance damping-off, seedling blight, pied noir, fonte de semis), which diseases lead to considerable losses to agriculture. Such germination diseases impair the crop yields either by reducing the number of plants or delaying their development process. Besides, these germination diseases frequently require resowing which involves additional cost and delay in the development process. Damages to crops due to germination diseases especially result when the germination and the shooting-up of the seeds are delayed by unfavorable conditions so that the seedlings, for a long time, retain their initial stages of growth during which they are especially predisposed to diseases. Shooting and germination are retarded in particular by low ground temperatures after sowing and adverse structure of the soil.

Whereas the mercury seed dressings formerly used are insufficiently effective against certain disease-carrying organisms, it has recently been found that such diseases can be decisively reduced by treatment with quinone oxime acyl hydrazones. These agents are not only effective against the organisms on the surface of the seeds and in the narrowly confined spermatosphere but, moreover, also protect the sprout and the root of the seedlings against certain fungicidal infections from the soil.

A large number of these compounds, which are described for instance in French Patent 1,093,364, have proved to be excellently effective as seed dressing agents against germination diseases. The superiority over organic mercury compounds is demonstrated by their capacity of eliminating infections originating from the soil to a substantially larger extent; besides, the desired effect can be reached with concentrations below the mercury proportions in mercury-containing disinfectants. Other metal-free substances which have been proposed as disinfectants against the same diseases require still higher concentrations in the disinfectants.

The principal object of the present invention is to provide a class of compounds having a strong fungicidal activity. Further objects will become apparent from the following description.

In accordance with the present invention it has been found that compounds of the general formula

have an excellent fungicidal activity against fungi and bacteria causing germination diseases. They are even effective against seed-borne diseases which are difficult to control by means of metal-free disinfectants and show an outstanding effect particularly against germination diseases of plants, beet, maize, flax and cotton. In this respect, they are not only far superior to the previously known metal-free compounds hitherto used in the control of these diseases, such as tetra-methyl-thiuram-disulfide, and 2,3-dichloro naphto-quinone-(1,4), but also to the preparations from organic mercury compounds.

As the above types of compounds there are to be understood those having the general formula

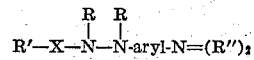

In this formula, R may be hydrogen or a direct additional N-N-bond; R′ together with X may be an organic or inorganic radical at the azo or hydrazo group. For instance, R' together with X may be linked to the hydrazide radical as CO—, CS—, NH—, or SO$_2$ group. The radical R' may also be linked to the hydrazine radical via a methine group, like a Schiff's base. Furthermore, R' and X may be the salt-like radical of a diazonium salt or the organic radical of a diazo- or diazoamino compound. The radical —N=(R")$_2$— standing in p-position to the above said groupings, is any substituted trivalent nitrogen atom, such as a substituted primary, secondary or tertiary amine, amide, a nitroso compound, or a nitroamine.

Some of the compounds of the aforedescribed type are known, others can be obtained by conventional methods which are illustrated in the following. By oxidation of the quinone oxime acyl hydrazones, which is preferably carried out in glacial acetic acid by means of nitric acid, for instance acylazophenols result. By reducing the oximes for instance with ammonium sulfide or a mixture of tin II-chloride and hydrochloric acid, the corresponding acyl derivatives of p-aminophenylhydrazines are obtained. They can be further modified at the amino and hydrazino group and oxidised to aminophenylazo compounds. By reaction with aldehydes, benzylidine compounds result; acyl-compounds are obtained by the reaction with acid anhydrides or acid chlorides. Besides, ureas, thioureas, isothiocyanates or other derivatives can be produced.

By reaction of hydrochloric acid or other mineral acids with certain p-aminophenyl-acylhydrazines the salts of p-aminophenyl-hydrazines result; p-aminophenyl-hydrazines however, is also obtainable by other conventional methods. When reacted with aldehydes, it yields benzylidene compounds.

By diazotizing derivatives of p-phenylenediamine, for instance p-aminoacetanilide or p-dimethylaminoaniline, there are obtained diazonium compounds which can be stabilized by conventional methods. From these azo compounds, p-amino-phenylhydrazines substituted in the amino group can be obtained by reduction.

Some representatives of the above said classes of compounds are given below by way of illustration, but it is to be understood that the scope of the invention is by no means restricted to the use of these compounds:

Benzoyl-azo-p-nitrosobenzene, chlorobenzoyl-azo-p-nitrosobenzene, benzoyl-azo - p - nitrosotoluene, p-aminophenylformylhydrazine, p-aminophenyl-acetylhydrazine, p-aminophenylcyanoacetylhydrazine, p - aminophenyl-amino-acetylhydrazine - hydrochloride, p-aminophenylaminoacetyl - hydrazine - hydrochloride, p-aminophenyl-methylamino-acetylhydrazine - hydrochloride, p-aminophenyl-dimethyl-aminoacetylhydrazine-hydrochloride, p-aminophenyl - trimethylammoniumchloride-acetyl-hydrazine - hydrochloride, p-aminophenylpyridiniumchloride-acetyl-hydrazine-hydrochloride, p-aminophenyl-hydroxyacetylhydrazine, p-amino - phenyl - methoxyacetylhydrazine, p-aminophenyl - methylthio - acetyl-hydrazine, p-aminophenyl-propionyl-hydrazine, p-aminophenyl-methoxycarbonylhydrazine, p-aminophenyl-benzoylhydrazine, p-aminophenyl-p-chlorobenzoylhydrazine, p-aminophenyl-p-aminobenzoyl-hydrazine, p-aminophenyl-phenylacetylhydrazine, p-aminophenyl-phenoxyacetyl hydrazine, p-aminophenyl - dichlorophenoxy-acetylhydrazine, oxalyl-bis-p-amino-phenylhydrazine, malonyl-bis-p-amino-phenylhydrazine, p-aminophenyl-furancarbonyhydrazine, p-aminophenyl-pyridylcarbonyl-hydrazine, p-aminophenyl-semi - carbazide, p-aminophenyl-thiosemicarbazide, p-amino-phenyl-phenyl-(thio)-semicarbazid, p-aminophenyl-amino-guanidine-dihydrochloride, benzoylazo-p-aminobenzene, chlorobenzoyl-azo-p-aminobenzene, furancarbonyl-azo-p-aminobenzene, acetylaminophenyl - benzoyl-hydrazine, p-nitrobenzylidene - aminophenyl-benzoylhydrazine, p-dimethyl-aminobenzylidene-aminophenyl- benzoylhydrazine, p-chloro - benzylidene-aminophenyl-benzoylhydrazine, p-hydroxy-benzylidene-aminophenyl-benzoylhydrazine, 2 - hydroxy-5-chlorobenzylidene-aminophenyl-benzoylhydrazine, 2-carboxy-benzoylaminophenyl-ethylcarbonic-hydrazine, p-chloro-benzylidene-aminophenyl-formylhydrazine, 2-hydroxy-5-chlorobenzylidene-aminophenyl-formylhydrazine, 2-hydroxy-5-chlorobenzylidene-aminophenyl-carboxyfurylhydrazine, p-chlorobenzylidene - aminophenyl-p-chlorophenyl-thioacetyl-hydrazine, p - chlorobenzylidene-aminophenyl-ethyl-carbonic-hydrazine, acetylazonitrosobenzene, phenylthiosemi-carbazine - p - methylthiourea, phenylthiosemicarbazine-p-ethoxy-phenylthiourea, phenylthiosemicarbazine-p-phenylthiourea, benzoylphenylhydrazine - p - phenylthiourea, benzoylphenyl-hydrazine - p - isothiocyanate, p-aminophenyl-hydrazine-dihydrochloride, p-aminophenylhydrazine-sulfate, p-aminophenylhydrazine-oxalate, p-amino-tolyl-hydrazine-dihydrochloride, benzylidene-aminophenyl - acetophenone - hydrazine, 4-methoxy-benzylidene-aminophenyl-4-methoxy - benzalhydrazone, 4-chlorobenzylidene-aminophenyl-4-chlorobenzal-hydrazone, 2-chloro - 5 - hydroxybenzylidene-aminophenyl-2-chloro-5-hydroxybenzalhydrazone, the sodium salt of p-acetyl-aminophenyl-diazosulfonic acid, p-acetylaminophenyl-diazo-(3-4-dichloro-) benzene sulfonate, p-acetylamino-benzene-diazo-cyclotetramethylene-imine, p-acetylaminophenyl-hydrazine-hydrochloride, and p-dimethylamino-benzene-diazosulfonic acid etc.

For the purpose of seed disinfection, the above said compounds are applied in the usual manner either as such or after addition of the customary diluents. They may be applied for instance in known manner as fungicidal dusting or sprinkling agent, as dry disinfectant or in solution as wet disinfectant or in suspension as slurry disinfectant. They may also be applied in admixture with other fungicides and/or insecticides and/or substances protecting seed grain from being eaten by birds, or agents improving their solubility.

To demonstrate the suitability of the compounds of the invention in the control of plant diseases, the result of experiments is given by way of example in the following tables. The experiments with peas and beets for the control of germination diseases were carried out under conditions which are most unfavorable for the growth of the plants. The germination medium was compost largely infected with phyto-pathogenic fungi.

The experiments were performed in autumn and winter months in a greenhouse which was lighted only with natural day-light and in which temperatures of 10–15° C. prevailed. Such conditions impair the power of resistance of the seedlings and promote infection.

The preparations were applied as dry disinfectants at the concentrations indicated in the examples. The compositions were extended with talcum. Instead of talcum, bentonite, chalk, clay, kieselguhr etc. may be used as carrier.

When applied as wet disinfectant, for instance water, alcohol, hydrocarbons, or lower ketones can be used as solvent or diluent. When used in form of a slurry disinfectant, suitable emulsifiers or wetting agents are added.

The experiments with peas were carried out with formulations containing 2 g. of the active substances per 1 kg. of seed and, in the case of sugar beets, with 6 g. per kg. of seed.

These proportions, however, may be varied within rather wide limits, say from 0.5–10 g. per kg. of seed; in some cases, still lower or higher quantities may be used.

Under the heading "healthy plants" or, in relation to beets, "healthy plants" and "healthy shooting-up spots," the number of the healthy shooting-up spots observed after 4 weeks is indicated in percent referred to 100 seeds.

EXAMPLE 1

*Experiments with polyembryonate sugar beet seed*

| active substance | concentration, percent | quantity applied in grams per 1 kg. of seed | after 4 weeks referred to 100 beet balls | |
|---|---|---|---|---|
| | | | healthy shooting-up spots | healthy plants |
| Undressed | | | 32 | 63 |
| Phenyl-Hg-acetate | [1] 2.2 | 6 | 60 | 133 |
| $H_2N-C(=S)-NH-NH-\langle\rangle-NH_2 + HCl$ | 15 | 6 | 74 | 154 |
| Undressed | | | 42 | 80 |
| Phenyl-Hg-acetate | [1] 2.2 | 6 | 58 | 108 |
| $H_2N-C(=S)-NH-NH-\langle\rangle-NH_2 + HCl$ | 5 | 6 | 66 | 132 |
| $H_2N-C(=S)-NH-NH-\langle\rangle-NH_2 + HCl$ | 2.5 | 6 | 58 | 110 |
| Undressed | | | 34 | 52 |
| Phenyl-Hg-acetate | [1] 2.2 | 6 | 38 | 52 |
| $\begin{array}{c}CH_3-N\\ \phantom{CH_3-N}\diagdown\\CH_3-NH\end{array}C-NH-NH-\langle\rangle-NH_2 + HCl$ | 15 | 6 | 50 | 112 |

[1] Hg.

EXAMPLE 2

*Experiments with peas (Aldermann peas)*

| active substance | concentration, percent | quantity applied in grams per 1 kg. of seed | healthy plants after 4 weeks in percent |
|---|---|---|---|
| Undressed | | | 16 |
| Phenyl-Hg-acetate | [1] 2.2 | 2 | 39 |
| $CH_3-S-CH_2CONH-NH-\langle\rangle-NH_2$ | 15 | 2 | 41 |
| $CH_3-S-CH_2CONH-NH-\langle\rangle-NH_2$ | 5 | 2 | 31 |
| Undressed | | | 25 |
| Phenyl-Hg-acetate | [1] 2.2 | 2 | 59 |
| $Cl-\langle\rangle-S-CH_2CONH-NH-\langle\rangle-NH_2$ | 2.5 | 2 | 81 |

[1] Hg.

EXAMPLE 3

*Tilletia tritici—spore germination test by the Gassner method*

| active substance | concentration, percent | quantity applied in grams per 1 kg. of seed | spore germination |
|---|---|---|---|
| Undressed | | | Complete. |
| CH₃—CH₂—CH₂—CH(CO—NH—NH—C₆H₄—NH₂)₂ | 15 | 1 | Nil. |
| CH₃—CH₂—CH₂—CH₂—CH(CO—NH—NH—C₆H₄—NH₂)₂ | 10 | 1 | A few spores here and there. |
| Cl—C₆H₄—S—CH₂CONH—NH—C₆H₄—NH₂ | 30 | 1 | Nil. |
| (H₃C)₂N—C₆H₄—CONH—NH—C₆H₄—NH₂ | 15 | 1 | Do. |
| (H₃C)₂N—C₆H₄—CONH—NH—C₆H₄—NH₂ | 10 | 1 | A few spores. |

EXAMPLE 4

*Experiment with peas (Aldermann peas) (spotted, non-picked peas)*

| active substance | concentration, percent | quantity applied in grams per 1 kg. of seed | healthy plants after 4 weeks in percent |
|---|---|---|---|
| Undressed | | | 6 |
| Phenyl-Hg-acetate | [1] 2.2 | 2 | 20 |
| C₂H₅—O—CO—NH—NH—C₆H₄—NH₂ + HCl | 15 | 2 | 52 |
| C₂H₅—O—CO—NH—NH—C₆H₄—NH₂ + HCl | 5 | 2 | 53 |

[1] Hg.

EXAMPLE 5

| active substance | Experiment | | | |
|---|---|---|---|---|
| | with peas (Aldermann peas) | | with polyembryonate sugar beet seed | |
| | concentration, percent | healthy plants | healthy shooting-up spots | healthy plants |
| Undressed | | 3 | 26 | 47 |
| Phenyl-Hg-acetate | [1] 2.2 | 15 | 52 | 111 |
| ⌬-CONH-NH-⌬-NHCOCH₃ | 5 / 15 / 50 | 63 / 80 / 60 | 49 / 69 / — | 99 / 165 / 143 |
| ⌬-CONH-NH-⌬-N=CH-⌬-NO₂ | 5 / 15 | 78 / 63 | 62 | 134 |
| ⌬-CONH-NH-⌬-C(=NH)-N(CH₃)-⌬-N(CH₃)₂ | 1 / 5 / 15 | 63 / 74 / — | 67 | 159 |
| ⌬-CONH-NH-⌬-N=CH-⌬-Cl | 5 / 15 | 78 / 63 | 63 / 71 | 132 / 148 |
| ⌬-CONH-NH-⌬-N=CH-⌬-OH | 2.5 / 5 | 63 / 65 | 70 | 157 |

[1] Hg.

EXAMPLE 6

| active substance | Experiment | | | |
|---|---|---|---|---|
| | with peas (Aldermann peas) | | with polyembryonate sugar beet seed | |
| | concentration, percent | healthy plants | healthy shooting-up spots | healthy plants |
| Undressed | | 0 | 33 | 78 |
| Phenyl-Hg-acetate | [1] 2.2 | 43 | 72 | 169 |
| HC(O)-NH-NH-⌬-N=CH-⌬-Cl | 5 / 15 | 82 / 70 | 80 / 66 | 171 / 142 |
| ⌬-CO-NH-NH-⌬-N=CH-⌬(Cl)(OH) | 5 / 15 | 63 / 66 | 69 | 156 |
| HCONH-NH-⌬-N=CH-⌬(Cl)(OH) | 5 / 15 | 68 / 69 | — | — |
| ⌬-CONH-NH-⌬-NH-CO-⌬-COOH | 50 | 30 | — | — |
| (epoxy-CH-CH-CH-CH)-C-CONH-NH-⌬-N=CH-⌬(Cl)(OH) | 5 / 15 | 60 / 54 | — | — |

[1] Hg.

EXAMPLE 7

| active substance | Experiment | | | |
|---|---|---|---|---|
| | with peas (Aldermann peas) | | with polyembryonate sugar beet seed | |
| | concentration percent | healthy plants | healthy shooting-up spots | healthy plants |
| Undressed | | 22 | 47 | 75 |
| Phenyl-Hg-acetate | [1] 2.2 | 34 | 65 | 138 |
| Cl—p—$C_6H_4$—S—$CH_2$CONH—NH—$C_6H_4$—N=CH—$C_6H_4$—p—Cl | 5 | 60 | | |
| $C_2H_5$O—C(=O)—NH—NH—$C_6H_4$—N=CH—$C_6H_4$—p—Cl | 5 | 53 | 64 | 140 |
| $C_2H_5$OC(=O)—NH—NH—$C_6H_4$—NH—C(=O)—$C_6H_4$—p—Cl | 5 / 15 | 42 / 36 | | |
| $C_2H_5$—O—C(=O)—NH—NH—$C_6H_4$—NH—CO—$CH_3$ | 50 | 60 | | |
| $C_2H_5$—O—C(=O)—NH—NH—$C_6H_4$—NH—CO—$NH_2$ | 5 | 28 | | |
| $H_2$N—C(=S)—NH—NH—$C_6H_4$—NH—C(=S)—$NHCH_3$ | 50 | 45 | | |
| $H_2$N—C(=S)—NH—NH—$C_6H_4$—NH—C(=S)—NH—$C_6H_4$—p—$OC_2H_5$ | 15 | 31 | | |
| $H_2$N—C(=S)—NH—NH—$C_6H_4$—NH—C(=S)—NH—$C_6H_5$ | 5 | 28 | | |
| $C_6H_5$—CO—NH—NH—$C_6H_4$—NH—C(=S)—NH—$C_6H_4$—p—$OC_2H_5$ | 50 | 43 | | |
| $C_6H_5$—CO—NH—NH—$C_6H_4$—NH—C(=S)—HN—$C_6H_5$ | 5 / 15 | 34 / 34 | | |

[1] Hg.

EXAMPLE 8

| active substance | Experiment | | | |
|---|---|---|---|---|
| | with peas (Aldermann peas) | | with polyembryonate sugar beet seed | |
| | concentration, percent | healthy plants | healthy shooting-up spots | healthy plants |
| Undressed | | 17 | | |
| Phenyl-Hg-acetate | [1] 2.2 | 60 | | |
| $C_6H_5$—C(=O)—NH—NH—$C_6H_4$—p—N=C=S | 2.5 / 10.0 | 69 / 70 | | |
| $C_2H_5$O—$CH_2$CONH—NH—$C_6H_4$—N=CH—$C_6H_4$—p—Cl | 5.0 / 15.0 | 78 / 81 | | |

[1] Hg.

To compare with the activity of the compounds according to the invention, the number of the shooting-up spots of undressed seed and the number of the shooting-up spots of seed dressed with a mercury disinfectant are given in the above tables.

EXAMPLE 9

| active substance | Experiment | | | |
|---|---|---|---|---|
| | with peas (Aldermann peas) | | with polyembryonate sugar beet seed | |
| | concentration percent | healthy plants | healthy shooting-up spots | healthy plants |
| Undressed | | 2 | 4 | 8 |
| Phenyl-Hg-acetate | [1] 2.2 | 46 | 40 | 76 |
| $\underset{CH_3}{C}=N-NH-C_6H_4-N=CH-C_6H_5$ (phenyl ring attached) | 1 / 5 / 15 / 50 | 65 / 87 / 89 / — | — / — / 35 / 43 | — / — / 91 / 84 |
| $CH_3O-C_6H_4-CH=N-NH-C_6H_4-N=CH-C_6H_4-p-OCH_3$ | 5 / 15 / 50 | 62 / 57 / 76 | — / 23 / 28 | — / 66 / 58 |
| $Cl-p-C_6H_4-CH=N-NH-C_6H_4-N=CH-C_6H_4-Cl$ | 5 / 15 / 50 | 61 / 75 / 80 | — / 42 / 45 | — / 79 / 87 |
| Bis[(2-hydroxy-5-chlorophenyl)methylene]-hydrazine derivative (OH, Cl substituted phenyl CH=N-NH-C_6H_4-N=CH- OH, Cl phenyl) | 5 | 10 | — | — |

[1] Hg.

EXAMPLE 10

| No. | active substance | concentration in percent | healthy plants after 4 weeks referred to 100 peas or 100 polyembryonate sugar beet balls | | | | | |
|---|---|---|---|---|---|---|---|---|
| | | | peas | beet | peas | peas | peas | peas |
| 1 | Undressed | | 9 | 104 | 9 | 0 | 2 | 6 |
| 2 | Phenyl-Hg-acetate | 2.2 | 39 | 137 | 55 | 43 | 24 | 32 |
| 3 | $CH_3CONH-C_6H_4-N=N-SO_2-C_6H_4-Cl$ | 5 | 25 | | | | | |
| 4 | | 15 | 26 | | | | | |
| 5 | | 50 | 51 | | | | | |
| 6 | $CH_3CONH-C_6H_4-N=N-N(CH_2-CH_2)_2$ (piperidine) | 5 | 35 | 142 | | | | |
| 7 | | 15 | 63 | 156 | | | | |
| 8 | | 50 | 64 | 138 | | | | |
| 9 | $CH_3CONH-C_6H_4-N=N-Cl + ZnCl_2$ | 5 | 25 | | | | | |
| 10 | | 15 | 39 | | | | | |
| 11 | | 50 | 56 | 167 | | | | |
| 12 | $CH_3CONH-C_6H_4-N=N-SO_3K$ | 5 | 51 | | | | | |
| 13 | | 15 | 60 | | | | | |
| 14 | | 50 | 67 | | | | | |
| 15 | $HCONH-C_6H_4-N=N-Cl + ZnCl_2$ | 5 | | | 46 | | | |
| 16 | | 15 | | | 53 | | | |
| 17 | | 50 | | | 58 | | | |
| 18 | $C_6H_5-CO-N=N-C_6H_4-NH_2$ | 5 | | | | 76 | | |
| 19 | | 15 | | | | 72 | | |
| 20 | | 50 | | | | 62 | | |
| 21 | $C_6H_5-CO-N=N-C_6H_4-NO$ | 0.5 | | | | | 43 | |
| 22 | | 1 | | | | | 48 | |
| 23 | | 5 | | | | | 78 | |
| 24 | $(CH_3)_2N-C_6H_4-N=N-SO_3Na$ | 5 | | | | | | 66 |
| 25 | | 15 | | | | | | 77 |
| 26 | | 50 | | | | | | 66 |
| 27 | $CH_3N(NO)-C_6H_4-N=N-C_6H_3(Cl)-Cl$ | 5 | | | | | | 35 |
| 28 | | 15 | | | | | | 36 |
| 29 | | 50 | | | | | | 46 |

EXAMPLE 11

A dry disinfectant consisting of 5% p-aminophenylhydrazine hydrochloride and 95% of talcum was applied in the usual manner to sugar beet seed in a quantity of 6 g. per 1 kg. of seed. For comparison, the seed thus treated and undressed seed and seed treated with a dry disinfectant containing 2.2% Hg in the form of phenyl-Hg-acetate were sown at the same time. The seeds were sown in wooden boxes in ordinary compost infected with phytopathogenic organisms and cultivation was carried out in the greenhouse at temperatures varying between 10 and 15° C. The untreated seed produced 58 healthy plants from 100 beet balls after 31 days, whereas 128 healthy plants were obtained from the seed treated with the mercury disinfectant. As compared therewith, the seed treated with the disinfectant containing p-aminophenylhydrazine-chlorohydrate produced 163 healthy plants. The application of this disinfectant did not show any depression of germination even when applied at a concentration of 50%.

We claim:

1. A fungicidal composition containing as an active ingredient 0.5–50% of a p-aminoarylazo compound of the general formula

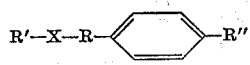

in which R is a radical selected from the group consisting of azo and hydrazo; X is a member selected from the group consisting of —CO—, —CS— and —SO₃—; R' is a member of the group consisting of a phenyl radical, an alkali metal, and amino; and R" a radical selected from the group consisting of nitroso and amino in an inert fungicidal adjuvant as a carrier therefor.

2. A composition of claim 1 wherein the active ingredient is

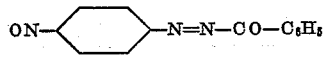

3. A composition of claim 1 wherein the active ingredient is

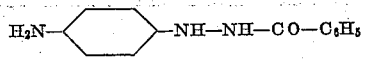

4. A composition of claim 1 wherein the active ingredient is

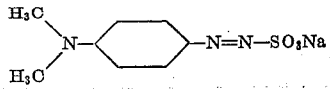

5. A process for controlling fungi which comprises applying to seed a fungicidal composition of claim 1.

6. The method of claim 5 wherein the active ingredient corresponds to the following structural formula

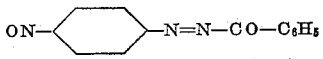

7. The method of claim 5 wherein the active ingredient corresponds to the following structural formula

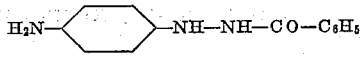

8. The method of claim 5 wherein the active ingredient corresponds to the following structural formula

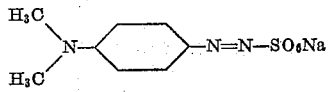

References Cited in the file of this patent
UNITED STATES PATENTS

| | | |
|---|---|---|
| 2,054,062 | Bonrath | Sept. 15, 1936 |
| 2,673,197 | Jensch | Mar. 23, 1954 |